US008138796B1

(12) United States Patent
Brumett, Jr.

(10) Patent No.: US 8,138,796 B1
(45) Date of Patent: Mar. 20, 2012

(54) SERIAL CONFIGURATION INTERFACE (75) Inventor: Thomas D. Brumett, Jr., San Jose, CA (US)

(73) Assignee: Silego Technology, Inc., Santa Clara, CA (US)

( * ) Notice: Subject to any disclaimer, the term of this patent is extended or adjusted under 35 U.S.C. 154(b) by 35 days.

(21) Appl. No.: 12/587,224

(22) Filed: Oct. 2, 2009

Related U.S. Application Data (60) Provisional application No. 61/195,091, filed on Oct. 3, 2008.

(51) Int. Cl.
*H01L 25/00* (2006.01)
(52) U.S. Cl. ............................. 326/101; 326/41; 326/47
(58) Field of Classification Search .............. 326/37–41, 326/47, 101
See application file for complete search history.

(56) References Cited

U.S. PATENT DOCUMENTS

| | | | | |
|---|---|---|---|---|
| 5,794,033 | A * | 8/1998 | Aldebert et al. | 713/100 |
| 7,622,948 | B1 * | 11/2009 | Wennekamp | 326/38 |
| 7,650,438 | B2 * | 1/2010 | Xia et al. | 710/8 |

* cited by examiner

*Primary Examiner* — Shawki S Ismail
*Assistant Examiner* — Thienvu Tran
(74) *Attorney, Agent, or Firm* — Van Pelt, Yi & James LLP

(57) ABSTRACT

A serial configuration interface (SCI) used to configure a device is disclosed. A device that support SCI includes a first connector configured to receive a first signal and a second connector configured to receive a second signal. In a configuration mode, the first signal serially selects each of a set of one or more configurable options, and the second signal facilitates selection of a desired setting of a selected configurable option. The device further includes control logic configured to determine when configuration of the device is complete and in response output the received first signal via a third connector of the device.

45 Claims, 7 Drawing Sheets

SERIAL CONFIGURATION INTERFACE

CROSS REFERENCE TO OTHER APPLICATIONS

This application claims priority to U.S. Provisional Patent Application No. 61/195,091 entitled SERIAL CONFIGURATION INTERFACE filed Oct. 3, 2008 which is incorporated herein by reference for all purposes.

BACKGROUND OF THE INVENTION

A bus such as the I²C (Inter-Integrated Circuit) bus or SMBus (System Management Bus) typically facilitates communication to and/or from devices in a computer system. However, the overhead and complexity required by such buses is not practical or economical for many devices. Thus, improved techniques for interconnecting, controlling, and/or configuring devices are needed.

BRIEF DESCRIPTION OF THE DRAWINGS

Various embodiments of the invention are disclosed in the following detailed description and the accompanying drawings.

FIG. 4B is an embodiment of a time diagram of a device on the SCI bus illustrating an example of entering Configuration Mode directly after power-on.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Various integrated circuits may have one or more configurable options. For example, LDO (low-dropout) regulators have internally settable output voltages; power-on reset circuits have internally settable delays before removing reset; watch-dog timers have internally settable pulse watch-dog times; FET (field-effect transistor) control circuits configured to switch FETs have internally settable delays before FET turn-on, internally settable gate/source voltage slew rates, and/or internally settable discharge rates during FET turn-off; etc. The selection of such optional parameters is in most cases supported by different top layer metal, requiring each device to be identified by a unique part number or part number suffix. If these devices were to be remotely configurable or programmable instead of metal layer configurable, there need be only one part number. Many integrated circuits in a computer system, however, are very low cost devices, and it is not economical to add the logic and control overhead required with the I²C bus or SMBus to support selection of configurable options via programming. Additionally, many circuits require very simple configuration, which again does not warrant the complexity of the I²C bus or SMBus. Thus, there exists a need for an improved technique for remotely configuring or programming circuitry that cannot afford the high overhead and/or does not need all of the capabilities of existing programming solutions such as the I²C bus or SMBus.

A Serial Configuration Interface (SCI) that supports a serial signaling protocol that can be used for programming configurable options in devices is disclosed. SCI comprises a low complexity (e.g., low pin count, low logic overhead) solution for configuring options in devices. In some embodiments, the SCI bus is primarily employed for configuring devices for run-time operation. In some such cases, other than optionally being used for configuration or status read-back and/or low bandwidth telemetry (e.g., temperature readings, current readings, voltage readings, etc.), the SCI bus does not function as a data communications bus and is not intended to replace existing data communications mechanisms such as the I²C bus or SMBus. In other embodiments, however, the SCI bus may be employed as a data communications bus for unidirectional and/or bidirectional data communication with and/or between one or more devices.

In some embodiments, SCI requires only 3 signal pins (e.g., one to signal to all devices daisy chained together by the bus, one to signal the first device in the daisy chain, and one signal from the last device in the daisy chain), and the number of devices that can be in a daisy chain has only a practical limit. SCI requires very low logic overhead, e.g., on the order of only 150 logic gates in some embodiments. Furthermore, in some embodiments, SCI comprises an asynchronous interface that does not require a clock. In such cases, the signaling rate of SCI is only limited by the logic delays in the devices connected by the bus and the speed of the driving microcontroller. In other embodiments, however, SCI may comprise a synchronous interface that requires a clock.

Although a particular signaling protocol for SCI is described with respect to many of the provided examples, the techniques described herein are not limited to the described signaling protocol. Any other appropriate signaling scheme or protocol and/or any variation of the described signaling protocol may be employed with respect to SCI in various embodiments. Moreover, SCI may be employed with respect to any one or more different modes of operation, a few of which are described in the given examples.

Figure 1A:
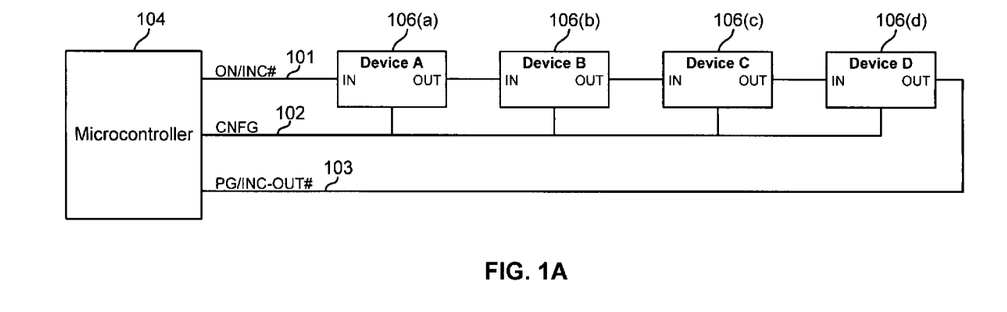
FIG. 1A is a block diagram illustrating an embodiment of a system level view of the manner in which an SCI bus is employed to configure a plurality of devices on the bus.

FIG. 1A is a block diagram illustrating an embodiment of a system level view of the manner in which an SCI bus is employed to configure a plurality of devices on the bus. As depicted in the given example, signal 101 (ON/INC#) and signal 102 (CNFG) of the SCI bus are managed by microcontroller 104. Devices 106(a)-(d) are daisy chained together by the bus to affect a positional addressing scheme for SCI. Specifically, the address of a particular device on an SCI bus is determined by its relative position with respect to other devices on the same bus and the number of configuration pointer registers in each device. Assume in the given example that Device A 106(a) has three configuration pointer registers and Device B 106(b) has four configuration pointer registers. In this example, when the eighth register in the configuration string is addressed, the first configuration pointer register in Device C 106(c) is addressed. Thus, all of the registers in a particular string of devices are sequentially accessed using the SCI bus.

ON/INC# signal 101 is used to select a specific configuration pointer internal to a device. A device may have any number of configuration pointers, e.g., depending on the number of configurable options or components in the device. CNFG signal 102 is used to enable or set a selected configuration pointer to a desired configuration option or setting. Once all pointers in a particular device have been set to enable the desired configuration settings of the device, the next toggle of ON/INC# signal 101 is passed on the OUT pin (PG/INC-OUT#) of the just configured device to the IN pin of the next device in the daisy chain. Thus, the selection of specific configuration options of devices on an SCI bus is facilitated by two tiers of counters to select a specific set of options from the available configuration options resident in each device. The PG/INC-OUT# signal 103 output by the last device 106(d) in the daisy chain is input into microcontroller 104 and indicates to microcontroller 104 when all devices on the bus have reached a power good (PG) state and/or have been configured.

The intelligence of operating the SCI bus, of the devices connected by the bus, and of the available configuration options of each device resides in the microcontroller 104 driving the SCI bus. Pushing this intelligence upstream to the microcontroller and away from low level devices on the SCI bus allows for the very low complexity local logic required to interface devices on the SCI bus. In some embodiments, each device 106 employing SCI includes a policy for pre-configuration default settings of the device such that each configuration pointer register of a device is set to a known power-on state by an associated pointer selecting the default configuration option. Thus, at power-on, suitable default configuration settings are in effect for each device. Knowledge of the default settings is available at microcontroller 104, which controls any further configuration or change in configuration of the devices.

In the example of FIG. 1A, SCI is employed with respect to a plurality of devices daisy changed together by the SCI bus. In other embodiments, SCI may be employed with respect to just a single device. Each of the various SCI signals (ON/INC#, CNFG, PG/INC-OUT#) may be unidirectional or bidirectional in various embodiments. In some embodiments, for example, the ON/INC# signal is unidirectional while the CNFG and PG/INC-OUT# signals are bidirectional. In FIG. 1A, only the connections associated with using SCI for configuring devices are depicted. Other connections may exist between the various components. For example, in some embodiments, the IN (ON/INC#) and OUT (PG/INC-OUT#) pins of each device 106 are connected to microcontroller 104, e.g., so that microcontroller 104 can control normal run-time operation of the device.

Microcontroller 104 and devices 106(a)-(d) in the example of FIG. 1A each include a communication interface configured to support the SCI signals and protocol. In some embodiments, a device configured to support SCI includes connectors (e.g., I/O pins) via which the SCI signals can be input and/or output as well as control logic configured to manage the signals input and/or output on the connectors. Each connector may support unidirectional and/or bidirectional communication in various modes.

Figure 1B:
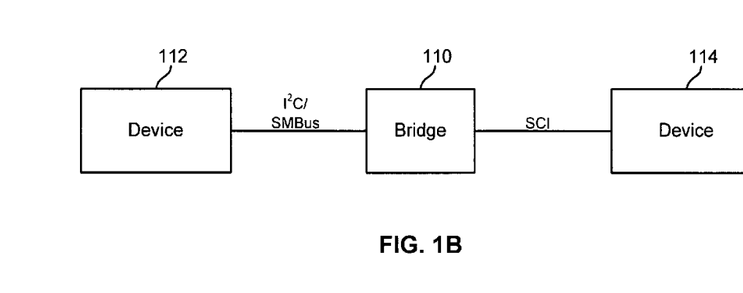
FIG. 1B is a block diagram illustrating an embodiment of a bridge device that translates communication signals to and from SCI.

Since SCI is a new interfacing technique, however, some existing components may not be configured to interface to or support SCI. For example, some legacy microcontrollers are configured to interface to the I$^2$C bus or SMBus but do not support SCI. In such cases, a bridging device may be employed to translate between an interface that a legacy component supports (e.g., I$^2$C or SMBus) and SCI. FIG. 1B is a block diagram illustrating an embodiment of a bridge device that translates communication signals to and from SCI. Bridge 110 connects a device 112 that does not support SCI to a device 114 that does support SCI. Communication between device 112 and bridge 110 occurs over an interface or bus other than SCI (e.g., I$^2$C, SMBus, etc.), and communication between bridge 110 and device 114 occurs over an SCI bus. For example, device 112 may comprise a legacy microcontroller that interfaces to bridge 110 via an I$^2$C bus or SMBus, and device 114 interfaces to bridge 110 via an SCI bus. In this example, bridge 110 translates between I$^2$C/SMBus and SCI signals. From the system level perspective of device 112, however, all communication appears to occur with respect to the I$^2$C/SMBus protocols.

Figure 2A:
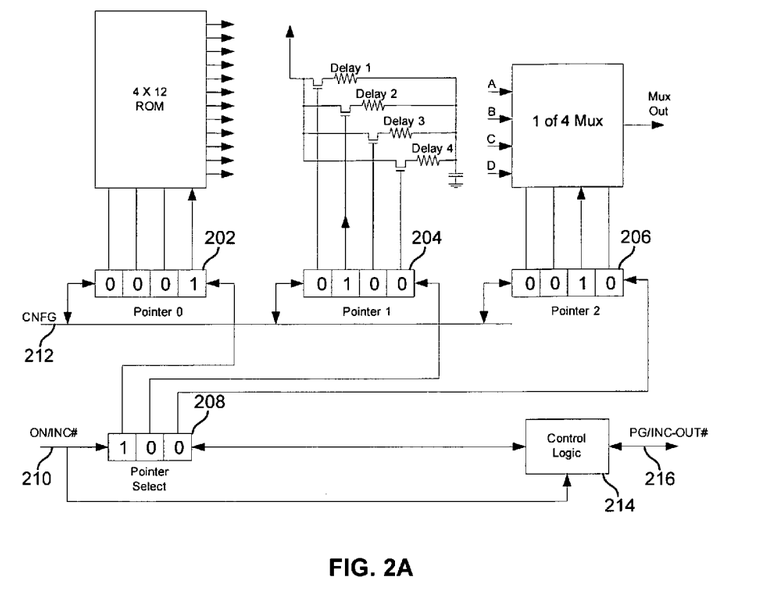
FIGS. 2A-2B illustrate an example of setting configuration options in a device on an SCI bus.
Figure 2B:
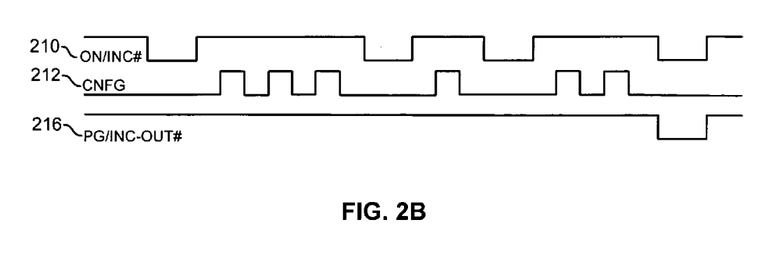

FIGS. 2A-2B illustrate an example of setting configuration options in a device on an SCI bus. For example, the device described with respect to FIGS. 2A-2B may comprise any of devices 106(a)-(d) of FIG. 1A or device 114 of FIG. 1B. Specifically, FIG. 2A is a functional block diagram illustrating an embodiment of the internal configuration options of a device which are configurable via the SCI bus, and FIG. 2B is an embodiment of a logic timing diagram of the operation of the SCI bus signals for this particular example in which the device has three sets of operational variables, each of which is configurable to one of four conditions. The initial power-on states of the configuration pointers are set to select default configuration settings. The device in the example of FIG. 2A requires that three separate options be configured prior to run-time operation of the device. The first configurable parameter comprises a selection of one of four 12-bit patterns stored in a metal mask ROM via configuration pointer register 202 (Pointer 0), the second configurable parameter comprises a selection of one of four possible circuit delays (Delay 1, Delay 2, Delay 3, or Delay 4) via configuration pointer register 204 (Pointer 1), and the third configurable parameter comprises a selection of one of four data streams (A, B, C, or D) to be applied to circuitry in the device via configuration pointer register 206 (Pointer 2). Pointer select register 208 is controlled by the ON/INC# signal 210 of the SCI bus, and configuration pointer registers 202-206 are controlled by the CNFG signal 212 of the SCI bus. Although not depicted, ON/INC# signal 210 and CNFG signal 212 are controlled by an associated microcontroller, such as microcontroller 104 of FIG. 1A. In the given example, pointer select register 208 is pointing to configuration pointer register 202, i.e., Pointer 0. Pointer 0 has a setting of 0001 after having been toggled three times to advance from its default power-on state of 1000. A pulse on the ON/INC# signal 210 will advance pointer select register 208 from 100 to 010 such that it points to configuration pointer register 204, i.e., Pointer 1.

The timing diagram of FIG. 2B provides an example of the manner in which the device of FIG. 2A is configured. The first pulse on ON/INC# signal 210 results in pointer select register 208 state 100, which results in configuration pointer register 202 (Pointer 0) to become selected. Three subsequent pulses on CNFG signal 212 advance Pointer 0 from its default state of 1000 to select address 0001 of the 4×12 ROM. The second pulse on ON/INC# signal 210 advances pointer select register 208 to state 010, which results in configuration pointer register 204 (Pointer 1) to become selected. The single following pulse on CNFG signal 212 advances Pointer 1 from its default state of Delay 1 (i.e., 1000 in configuration pointer register 204) to select Delay 2 (i.e., 0100 in configuration pointer register 204). The third pulse on ON/INC# signal 210 advances pointer select register 208 to state 001, which results in configuration pointer register 206 (Pointer 2) to become selected. Two subsequent pulses on CNFG signal 212 advance Pointer 2 from its default state of signal path A as the multiplexor output (i.e., 1000 in configuration pointer register 206) to select signal path C as the multiplexor output (i.e., 0010 in configuration pointer register 206). The fourth pulse on ON/INC# signal 210 is directed to SCI control logic 214 in the device, which passes the signal through the device to appear at the device output (PG/INC-OUT#), which is connected to the input (ON/INC#) of the next device in the daisy chain. SCI control logic 214 automatically passes the fourth ON/INC# pulse, i.e., on PG/INC-OUT# line 216, downstream since the device of the given example only has three configuration pointers. As previously described, ON/INC# signal 210 and CNFG signal 212 are managed by an associated microcontroller which has knowledge of the topologies of the devices on the SCI daisy chain and the registers in the chain. Microcontroller management of SCI allows very low gate count and very low complexity logic in each device (i.e., SCI control logic 214) to implement the SCI protocol.

In the event that no changes to the current configurations of one or more devices in a daisy chain are needed, the system configuration can be accelerated by bypassing or skipping devices by toggling the ON/INC# line. For instance, if N registers that do not need to be configured remain in a device or string of devices beyond the currently selected register, the ON/INC# line is toggled N+1 times to achieve a power good state. For example, if three devices, each with three registers, are daisy chained together and the first register of the second device (i.e., device 2, register 1) is currently selected, then five additional registers remain to be accessed in the complete chain. Therefore, in this example, a succession of six ON/INC# pulses will result in a PG/INC-OUT# pulse at the microcontroller input indicating completion of configuration.

Figure 3A:
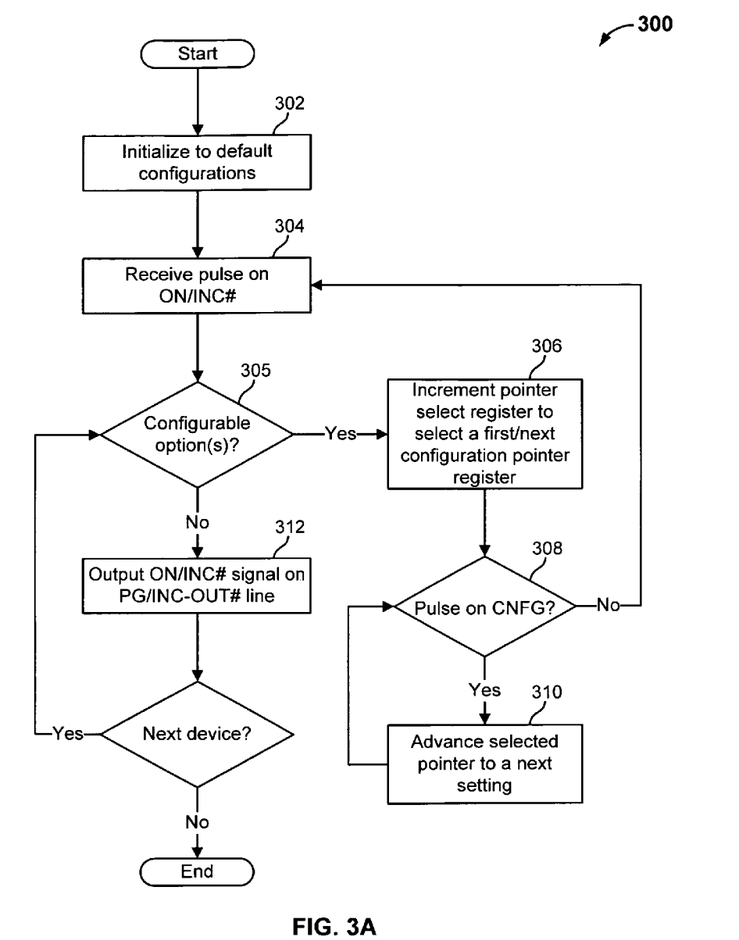
FIG. 3A is a flow chart illustrating an embodiment of a process for serially configuring devices using a serial bus such as the SCI bus.

FIG. 3A is a flow chart illustrating an embodiment of a process for serially configuring devices using a serial bus such as the SCI bus. For example, process 300 may be employed by devices 106 of FIG. 1A or the device of FIG. 2A. Process 300 starts at 302 at which one or more devices daisy chained together via an SCI bus are initialized to default configurations. In some cases, for example, the devices are initialized to default settings at power-on. At 304, a first pulse on the ON/INC# signal is received by a first device in the daisy chain. If a configurable option exists in the device, a pointer select register of the device is incremented in response to the ON/INC# pulse of 304 to select a first configuration pointer register in the device at 306. At 308, it is determined whether the CNFG signal has been pulsed. The selected pointer is advanced at 310 in response to a pulse on the CNFG signal to select a next setting; and process 300 subsequently returns to step 308. In some cases as described above with respect to the example of FIGS. 2A-2B, each pulse on the CNFG signal increments or advances the pointer so that a desired setting can be selected. No more pulses are received on the CNFG signal at 308 once a desired setting has been selected. If a default setting is desired for the selected pointer, the CNFG signal is not pulsed at all at 308. Process 300 continues at step 304 at which a next pulse on the ON/INC# signal is received. If another configurable option exists in the device, process 300 continues at step 306 at which the pointer select register of the device is incremented in response to the ON/INC# pulse of 304 to select a next configuration pointer register in the device. Steps 304-310 of process 300 are iterated for each configurable option of a given device. If no or no further configurable options exist in the device, the ON/INC# pulse received at 304 is output from the device on its PG/INC-OUT# line at 312. If the device is daisy chained to another device, the PG/INC-OUT# line output by the device is input into the ON/INC# line of the next device, and process 300 continues at step 305 with respect to the next device. If the device is not daisy chained to another device and/or is the last device in the daisy chain, the PG/INC-OUT# line is input into an associated microcontroller or other device and indicates that all device(s) in the daisy chain are in a power good state and/or have been configured. Process 300 subsequently ends.

Figure 3B:
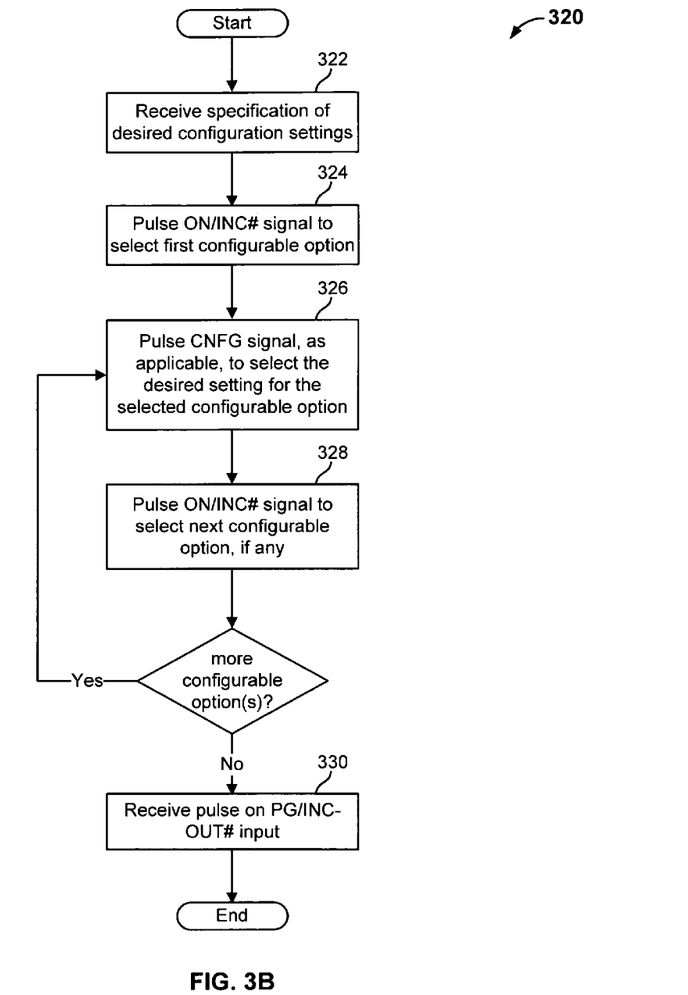
FIG. 3B is a flow chart illustrating an embodiment of a process for serially configuring devices using a serial bus such as the SCI bus.

FIG. 3B is a flow chart illustrating an embodiment of a process for serially configuring devices using a serial bus such as the SCI bus. For example, process 320 may be employed by microcontroller 104 of FIG. 1A. Process 320 starts at 322 at which a specification of desired configuration settings for one or more devices daisy chained together via an SCI bus is received, e.g., remotely from a user or another device or process. At 324, the ON/INC# signal is pulsed to select the first configurable option in the chain. At 326, the CNFG signal is pulsed one or more times, as applicable, to select the desired setting for the selected configurable option. In some embodiments, if the default setting is desired, the CNFG signal is not pulsed at all at 326. At 328, the ON/INC# signal is pulsed again. If other configurable options exist in the chain, the next configurable option in the chain is selected by the ON/INC# pulse of 328, and process 320 continues at step 326. If no more configurable options exist in the chain, the ON/INC# pulse of 328 is received at a PG/INC-OUT# input at 330 and indicates that all device(s) in the daisy chain are in a power good state and/or have been configured. Process 320 subsequently ends.

In the examples provided thus far, a configuration mode of the SCI bus is described in which configurable options of one or more devices are programmed using the signaling scheme of SCI. In some embodiments, SCI is architected to employ the ON/INC# and PG/INC-OUT# signals in two distinct modes of operation: a run mode and a configuration mode. The Run Mode corresponds to a normal operating or control mode of a device. In the Run Mode, the input and output signals associated with a device are ON and PG, respectively. The Configuration Mode corresponds to a programming mode of a device for selecting settings for configurable options. In the Configuration Mode, the input and output signals associated with a device are INC# and INC-OUT#, respectively. In some embodiments, as further described in the examples below, toggling between the Run Mode and Configuration Mode is achieved by substantially simultaneously pulsing the ON/INC# and CNFG signals.

Figure 4A:
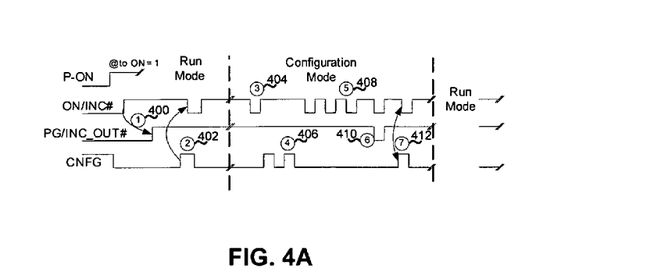
FIG. 4A is an embodiment of a time diagram of a device on the SCI bus illustrating an example of transitioning between Run Mode and Configuration Mode.

In some embodiments, the default policy of the SCI architecture is to set the SCI control logic in Run Mode at power-on. In some such cases, normal operation of each device on the bus at default configuration settings occurs if ON is asserted at power-on. FIG. 4A is an embodiment of a time diagram of a device on the SCI bus illustrating an example of transitioning between Run Mode and Configuration Mode. The device starts out in Run Mode at power-on (i.e., when P-ON is asserted), for example, because ON is asserted at power-on. Run Mode values of the ON and PG signals are indicated at ①400. Substantially simultaneous pulses on the CNFG and ON/INC# signals ②402 while in Run Mode toggles the device into Configuration Mode. Once in Configuration Mode, the pulse on the INC# signal ③404 selects the first configuration pointer register of the device, and the following two pulses on the CNFG signal ④406 advances the selected pointer to a desired setting. Further pulses on the INC# signal ⑤408 result in the bypass of the configuration of the second, third, and fourth registers of the device, e.g., because the default configuration settings are desired for those registers. Subsequently, the INC# signal of the device is output on its INC-OUT# line ⑥410, implying configuration of at least that device is complete. Substantially simultaneous pulses on the CNFG and ON/INC# signals ⑦412 toggles the device from Configuration Mode back into Run Mode.

Figure 4B:
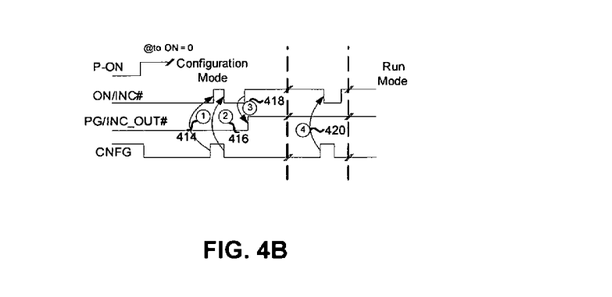

In some embodiments, SCI may initialize to the Configuration Mode at power-on, e.g., if the ON signal is not asserted after power-on, so that the system microcontroller can immediately intervene to change device settings at power-on. FIG. 4B is an embodiment of a time diagram of a device on the SCI bus illustrating an example of entering Configuration Mode directly after power-on. As depicted, at power-on, the ON signal remains de-asserted. Substantially simultaneous pulses on the CNFG and ON/INC# signals ①-②414-416 puts the device into Configuration Mode. In the SCI signaling scheme described in some of the examples herein, the INC# and INC-OUT# signals by default are high (1) while in the Configuration Mode. Thus, the ON/INC and PG/INC-OUT# signals are asserted ③418 to enter Configuration Mode. Substantially simultaneous pulses on the CNFG and ON/INC# signals ④420 toggles the device from Configuration Mode into Run Mode.

In some embodiments, the Configuration Mode includes two distinct modes: a data read mode for status read-back and/or low bandwidth telemetry and a standard configuration mode for selecting settings for configurable options. In some embodiments, as further described in the example below, the PG/INC-OUT# line of a device is employed by an associated microcontroller to instruct or signal a selected register in the Configuration Mode to enter a Data Read Mode, during which digital data is output by the selected register on the bidirectional CNFG line while being clocked by the ON/INC# line. The Data Read Mode can be employed as a manner for communicating to the mircontroller data associated with a device such as current configuration settings; local voltage, current, and/or temperature values recorded at the device; etc.

Figure 5:
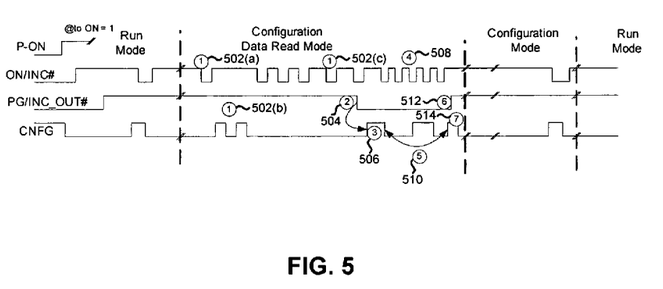
FIG. 5 is an embodiment of a timing diagram of a device illustrating an example of different modes of the SCI bus.

FIG. 5 is an embodiment of a timing diagram of a device illustrating an example of different modes of the SCI bus. The device starts out in Run Mode, e.g., because the ON signal is asserted at power-on. Substantially simultaneous pulses on the CNFG and ON/INC# signals while in Run Mode toggles the device into Configuration Mode. Once in Configuration Mode, the system microcontroller advances to the register to be read ①502, at which point the microcontroller drives PG/INC-OUT# low ②504, indicating Data Read Mode. The next pulse on the CNFG line ③506 reverts it to an input of the microcontroller, and the pulses on the ON/INC# line ④508 function as a clock to serially shift data ⑤510 (in this case the five bits 00110) onto the CNFG line to the microcontroller. When the data has been received, the microcontroller re-asserts PG/INC-OUT# ⑥512, and the next pulse on the CNFG line ⑦514 reverts it to a microcontroller output. The device remains in Configuration Mode pending additional reads and/or configuration actions until substantially simultaneous pulses on the CNFG and ON/INC# signals toggles the device from Configuration Mode back into Run Mode.

Figure 6:
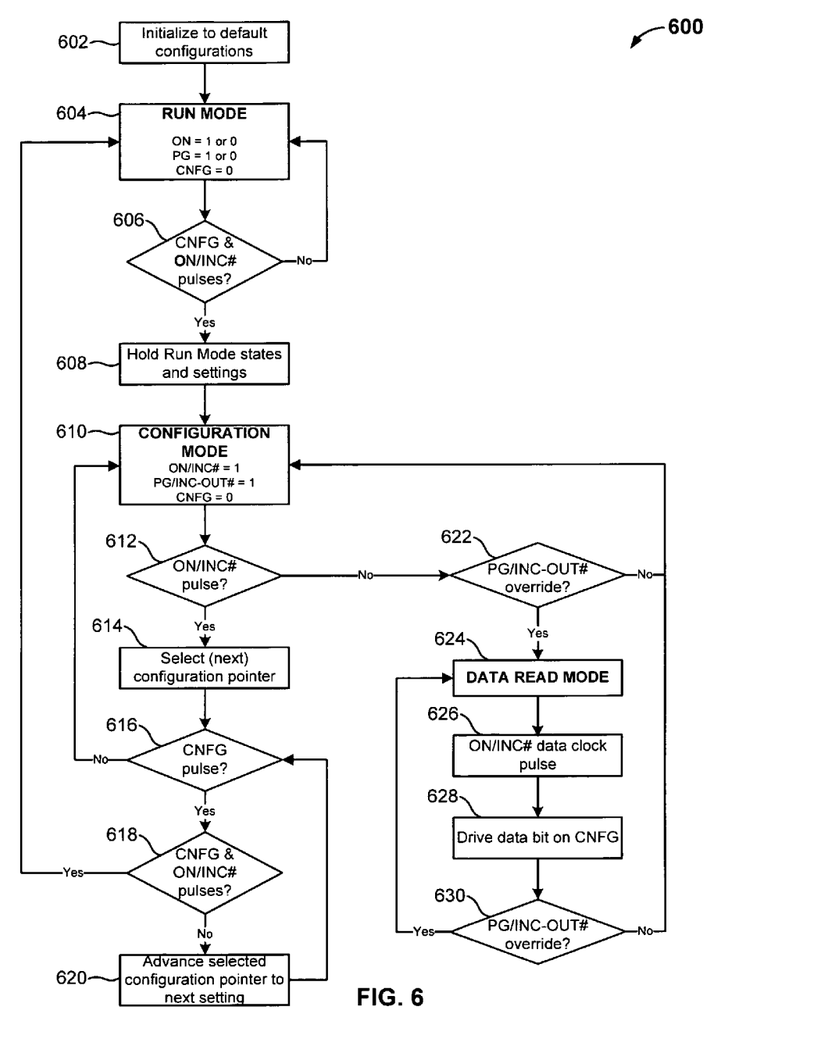
FIG. 6 is a flow chart illustrating an embodiment of a process for transitioning between various SCI states or modes.

FIG. 6 is a flow chart illustrating an embodiment of a process for transitioning between various SCI states or modes. Although process 600 is described with respect to single device, process 600 may be employed with respect to a plurality of devices daisy chained together via an SCI bus. For example, process 600 may be employed with respect to the system described in FIG. 1A. Process 600 starts at 602 at which a device on the SCI bus is initialized to default configurations. For example, the device may be initialized to default configurations due to power-on at 602. In some embodiments, the device may be reset to default configurations at 602. In some such cases, for instance, the device is reset to its default configurations via substantially simultaneous pulses on the PG/INC-OUT# and CNFG lines of the device. At 604, the device is in Run Mode. During Run Mode, the ON/INC# signal of the device is high (1) or low (0), as applicable; the PG/INC-OUT# signal of the device is high (1) or low (0), as applicable; and the CNFG signal of the device is low (0). Although in the example of process 600 a device is shown to initially enter Run Mode at 604, e.g., after power-on at 602, in other embodiments, devices on the SCI bus may be first configured as described with respect to FIG. 4B. That is, in some embodiments, it is a system dependent decision whether to configure devices prior to initial run-time or not. Substantially simultaneous pulses on the CNFG and ON/INC# lines at 606 toggle the device out of Run Mode. At 608, the pre-configuration states of device options and runtime settings of the device are held or maintained as the device enters Configuration Mode at 610. During Configuration Mode, the ON/INC# and PG/INC-OUT# signals of the device are by default high (1) while the CNFG signal is by default low (0). A pulse on the ON/INC# line at 612 results in a (next) configuration pointer to be selected at 614. If no or no further pulse on the CNFG signal follows at 616, process 600 continues in the Configuration Mode at 610. If a pulse on the CNFG signal follows at 616, it is determined at 618 if the CNFG pulse coincides with a substantially simultaneous pulse on the ON/INC# line, and if so, the device is toggled out of Configuration Mode and back into Run Mode, with process 600 returning to step 604. If it is determined at 618 that the CNFG pulse of 616 does not coincide with a substantially simultaneous pulse on the ON/INC# line, the selected configuration pointer is incremented or advanced to select a next setting, and process 600 continues at 616. While in the Configuration Mode, a PG/INC-OUT# override signal (e.g., PG/INC-OUT# low) at 622 toggles the device into a Data Read Mode at 624. At 626, an ON/INC# data clock pulse drives a data bit onto the CNFG signal at 628. The device remains in Data Read Mode until the PG/INC-OUT# signal is re-asserted, which toggles the device out of Data Read Mode and back into Configuration Mode.

Since in some embodiments the CNFG line is not used (e.g., is de-asserted) during Run Mode, it can be employed for alarm conditions during Run Mode. In some such cases, a pulse train driven on the CNFG line during Run Mode is an indication of an alarm or interrupt condition at a device on the SCI bus. The information or data on the pulse train may comprise a system dependent variable that can be used to further identify the alarm condition, e.g. device ID, value of limit or threshold exceeded, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
    a first connector configured to receive a first signal, wherein in a configuration mode the first signal serially selects each of a set of one or more configurable options;
    a second connector configured to receive a second signal, wherein in the configuration mode the second signal facilitates selection of a desired setting of a selected configurable option; and
    control logic configured to determine when configuration of the device is complete and in response output the first signal via a third connector;
    wherein the third connector is configured to receive a third signal during the configuration mode that facilitates toggling the device between the configuration mode and a data read mode.

2. The device of claim 1, wherein one or more configurable options associated with the device are sequentially programmed in the configuration mode via the first signal and the second signal.

3. The device of claim 1, wherein the set of one or more configurable options is associated with a set of one or more devices, including the device.

4. The device of claim 3, wherein the one or more devices are daisy chained together.

5. The device of claim 4, wherein an output of the third connector is input into an adjacent device in the daisy chain.

6. The device of claim 3, wherein the one or more devices are sequentially configured in the configuration mode.

7. The device of claim 1, wherein an output of the third connector is input into an associated microcontroller.

8. The device of claim 1, wherein the first signal and the second signal are output by an associated microcontroller.

9. The device of claim 1, wherein the first signal facilitates selection of a configuration pointer.

10. The device of claim 1, wherein the second signal facilitates selection of a configuration pointer setting.

11. The device of claim 1, wherein the second connector is configured to output data during the data read mode.

12. The device of claim 1, wherein during the data read mode the second connector is configured to output a data bit in response to a pulse on the first signal.

13. The device of claim 1, wherein during the data read mode the device is configured to output one or more of: a configuration setting, a voltage value, a current value, and a temperature value.

14. The device of claim 1, wherein in a normal operating mode of the device the first signal comprises an input signal and the third connector is configured to output an output signal.

15. The device of claim 1, wherein in a normal operating mode of the device the second connector is configured to output an alarm or interrupt indication.

16. The device of claim 1, wherein the first signal and the second signal facilitate toggling the device between the configuration mode and a normal operating mode.

17. The device of claim 1, wherein the control logic is further configured to manage inputs and outputs of the first connector, the second connector, and the third connector.

18. The device of claim 1, wherein the first connector, second connector, third connector, and control logic comprise a communication interface.

19. The device of claim 1, wherein at power-on during a normal operating mode of the device one or more configurable options associated with the device are set to default settings.

20. The device of claim 1, wherein one or more configurable options associated with the device are remotely programmable.

21. The device of claim 1, wherein the device comprises one or more of: a low-dropout regulator, a power-on reset circuit, a watch-dog timer, and a control circuit for switching a transistor.

22. The device of claim 1, wherein the device does not support communication via an $I^2C$ bus or an SMBus.

23. A method for configuring a device, comprising:
    receiving a first signal at a first connector of the device, wherein in a configuration mode the first signal serially selects each of a set of one or more configurable options;
    receiving a second signal at a second connector of the device, wherein in the configuration mode the second signal facilitates selection of a desired setting of a selected configurable option; and
    in response to determining that configuration of the device is complete, outputting the first signal via a third connector;
    wherein the third connector is configured to receive a third signal during the configuration mode that facilitates toggling the device between the configuration mode and a data read mode.

24. A computer program product for configuring a device, the computer program product being embodied in a non-transitory computer readable storage medium and comprising computer instructions for:
    receiving a first signal at a first connector of the device, wherein in a configuration mode the first signal serially selects each of a set of one or more configurable options;
    receiving a second signal at a second connector of the device, wherein in the configuration mode the second signal facilitates selection of a desired setting of a selected configurable option; and
    in response to determining that configuration of the device is complete, outputting the first signal via a third connector;
    wherein the third connector is configured to receive a third signal during the configuration mode that facilitates toggling the device between the configuration mode and a data read mode.

25. The method of claim 23, wherein one or more configurable options associated with the device are sequentially programmed in the configuration mode via the first signal and the second signal.

26. The method of claim 23, wherein the set of one or more configurable options is associated with a set of one or more devices, including the device.

27. The method of claim 26, wherein the one or more devices are daisy chained together.

28. The method of claim 27, wherein an output of the third connector is input into an adjacent device in the daisy chain.

29. The method of claim 26, wherein the one or more devices are sequentially configured in the configuration mode.

30. The method of claim 23, wherein an output of the third connector is input into an associated microcontroller.

31. The method of claim 23, wherein the first signal and the second signal are output by an associated microcontroller.

32. The method of claim 23, wherein the first signal facilitates selection of a configuration pointer.

33. The method of claim 23, wherein the second signal facilitates selection of a configuration pointer setting.

34. The method of claim 23, wherein the second connector is configured to output data during the data read mode.

35. The method of claim 23, wherein during the data read mode the second connector is configured to output a data bit in response to a pulse on the first signal.

36. The method of claim 23, wherein during the data read mode the device is configured to output one or more of: a configuration setting, a voltage value, a current value, and a temperature value.

37. The method of claim 23, wherein in a normal operating mode of the device the first signal comprises an input signal and the third connector is configured to output an output signal.

38. The method of claim 23, wherein in a normal operating mode of the device the second connector is configured to output an alarm or interrupt indication.

39. The method of claim 23, wherein the first signal and the second signal facilitate toggling the device between the configuration mode and a normal operating mode.

40. The method of claim 23, wherein the control logic is further configured to manage inputs and outputs of the first connector, the second connector, and the third connector.

41. The method of claim 23, wherein the first connector, second connector, third connector, and control logic comprise a communication interface.

42. The method of claim 23, wherein at power-on during a normal operating mode of the device one or more configurable options associated with the device are set to default settings.

43. The method of claim 23, wherein one or more configurable options associated with the device are remotely programmable.

44. The method of claim 23, wherein the device comprises one or more of: a low-dropout regulator, a power-on reset circuit, a watch-dog timer, and a control circuit for switching a transistor.

45. The method of claim 23, wherein the device does not support communication via an $I^2C$ bus or an SMBus.

* * * * *